Feb. 23, 1926.

G. L. MORRIS

HONEY EXTRACTOR

Filed Dec. 15, 1921

1,574,051

INVENTOR.
GEORGE L. MORRIS.
BY A. B. Bowman
ATTORNEY

Patented Feb. 23, 1926.

1,574,051

UNITED STATES PATENT OFFICE.

GEORGE L. MORRIS, OF BONSALL, CALIFORNIA.

HONEY EXTRACTOR.

Application filed December 15, 1921. Serial No. 522,674.

*To all whom it may concern:*

Be it known that I, GEORGE L. MORRIS, a citizen of the United States, residing at Bonsall, in the county of San Diego and State of California, have invented a certain new and useful Honey Extractor, of which the following is a specification.

My invention relates to extracting machines for extracting honey from honeycomb, and more particularly to the centrifugal type of extractors. The present invention is an improvement over my former invention constituting the subject matter of my application for Letters Patent of the United States for honey extractor, Serial No. 442,970, filed Feb. 7, 1921, and some of the objects of my improvement are: to provide an extractor of the type described which shall comprise a plurality of receptacles or cages for receiving several honeycombs at the same time; to hold the comb cages and the combs placed therein positively tangential to the orbit in which they are whirled; to provide means by which the cages and their combs may be easily, quickly and automatically rotated one-half turn so that the honey may be extracted alternately from the cells on the opposite sides of the comb; to provide such means by which the cages and their combs may be be automatically rotated a one-half revolution, a whole revolution, or several revolutions forwardly if desired; to avoid slipping of the cages from their predetermined tangential position; that all the cages may be rotated thus simultaneously to provide for the easy insertion into and removal of the honeycomb from the cages; to provide for the easy removing and remounting of the cages in the extractor for cleaning; simplicity of construction, and operation, strength, durability, and to provide such a honey extractor which will not readily get out of order.

Figure 1:
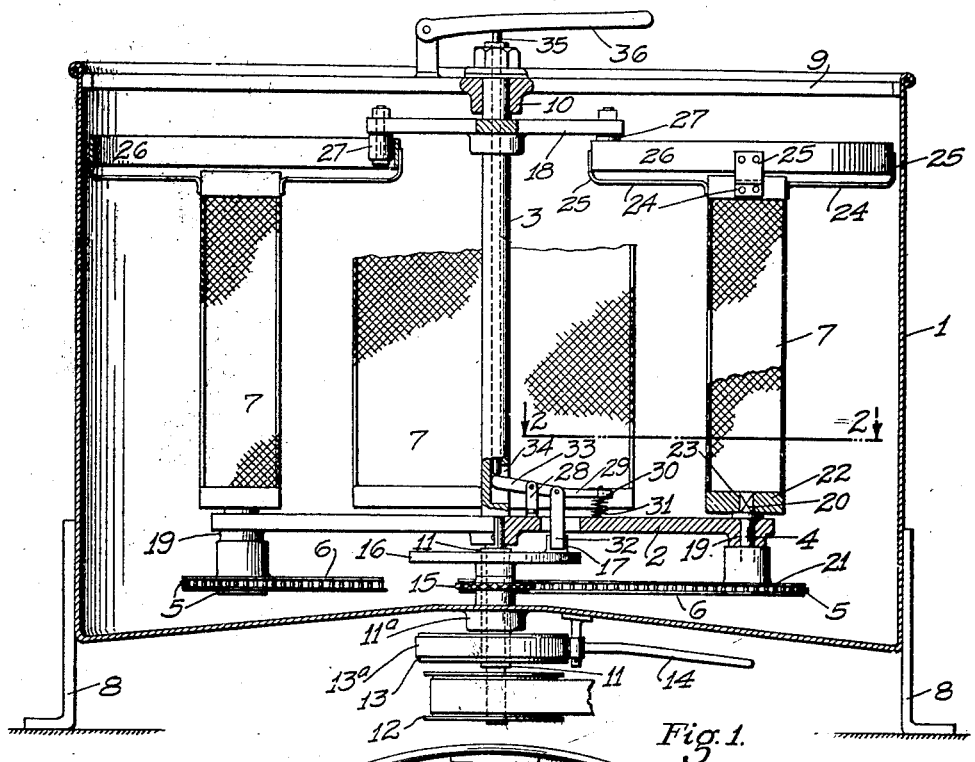
Figure 2:
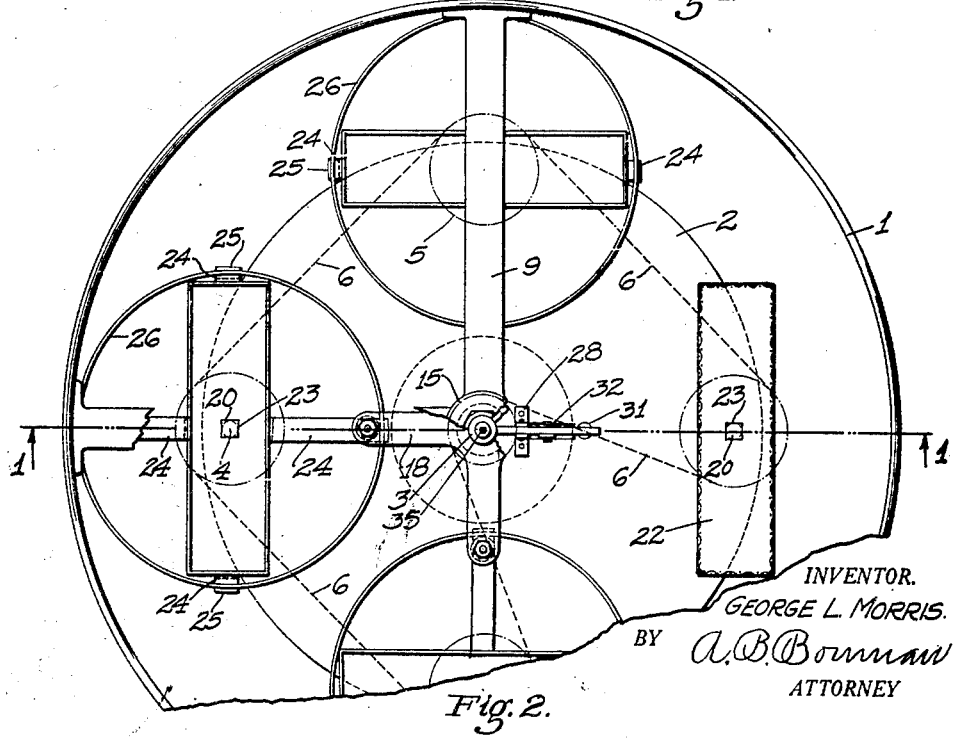

With these and other objects in view as will appear hereinafter my invention consists of certain novel features of construction, combination and arrangement of parts and portions as will be hereinafter described in detail and particularly set forth in the appended claims, reference being had to the accompanying drawings and to the characters of reference thereon which form a part of this application in which:

Fig. 1 is an elevational view, partly in section, and Fig. 2 is a fragmentary top plan view, partly in section.

Similar characters of reference refer to similar parts and portions throughout the several views of the drawings.

The principal parts of my honey extractor are, the cylindrical case 1, the horizontal disk 2, the vertical axial shaft 3, the short vertical shafts 4, sprocket wheels 5, chain 6 and cages 7.

The case 1 is a circular tank, with its bottom somewhat raised in the center so that it slopes toward the circumference forming a channel in which the extracted honey collects. It it provided with suitable legs 8 to raise the bottom from the floor. A four-armed spider 9 is mounted in the top of the case.

The vertical shaft 3 is hollow and mounted in the center of tank 1 in a journal bearing 10 in the center of spider 9 at the top and passes through the bottom of the tank 1 and is journaled in a quill 11 which in turn is journaled in a bearing 11$^a$. A tight pulley 12 is mounted on the lower end, by which it is driven, a band brake drum 13 and brake band 13$^a$ with a brake lever 14 is mounted tight on quill 11. Just above the bottom of tank 1 quill 11 is provided with a tight sprocket wheel 15 and above this with a tight clutch disk 16 provided with a lug or jaw 17. Above, just under spider 9 and bearing 10 is mounted on shaft 3 a tight, four-armed spider 18.

The carrier disk 2 is tight mounted on shaft 3 just above clutch disk 16 so that it is driven and whirled by the shaft through the pulley 12. At four points near the periphery and in vertical alinement with the extended axes of the arms of spider 18 are provided journal bearings 19. In these are mounted the vertical shafts 4, which are formed at their upper ends with angular, preferably square tenons 20 and on the lower ends of which are mounted the tight sprocket wheels, 5.

The sprocket wheels 5 are all connected together and with the central sprocket wheel 15 by means of the sprocket chain 6 as shown by the dotted line in Fig. 2. All the sprocket wheels 5 are of the same size but wheel 15 is only one-half the size of wheels 5, so that a complete revolution of wheel 15 produces a half revolution of wheels 5.

The cages 7 are of rectangular cross section and of such dimensions that a whole honeycomb may enter loosely. The four walls are formed of wire mesh or perforated sheet material, the top is open and the bottom is formed of a rectangular piece 22, with a mortise 23 in the center adapted to fit over and engage tenon 20 of shafts 4. At the upper end they are provided with four arms 24 which are up-turned at their outer ends to form brackets 25. Into brackets 25 is secured an annular band 26 which is concentric with the axis of the cage. The cages stand with their longer planes tangential to the orbit of revolution.

At the outer ends of the arms of spider 18 are mounted depending rollers 27 in such a manner that they engage and may roll against the internal surface of bands 26 and retain them and their cages 7 in vertical alinement against the centrifugal force due to whirling in their orbit and yet permit their rotation with shafts 4.

It will now be understood that disk 2, shaft 3, sprockets 5, chain 6, sprockets 15, spider 18 and cages 7 all normally rotate together and it is only when it is required to rotate cages 7 a half revolution in order to extract the opposite side of the honeycomb that chain 6 and the sprocket wheels are brought into play. To accomplish this the following apparatus is provided:

A standard 28 is secured or formed on the bottom of case 1. In the top of this is fulcrumed a lever 29 the member 30 of which is normally depressed by a tension spring 31. A clutch bar 32 is pivotally mounted on lever 29 and depends through a slot in disk 2 and engages jaw 17 of disk 16. This serves to drive disk 16 and its sprocket 15 normally with disk 2 so that cages 7 revolve in stationary relation to disk 2. Member 33 of lever 29 extends through a slot 34 into hollow shaft 3. A stem 35 is mounted in shaft 3 so as to engage lever 29 at its lower end and extends above at the upper end. A stationary lever 36 is fulcrumed on spider 9 in such a position that it rests upon the upper end of stem 35.

Now, while the machine is operating and the cages 7 are whirling, pressure upon lever 36, through stem 35 depresses member 33, lifts member 30 and clutch bar 32 and releases disk 16. Disk 16, being mounted on quill 11 with brake drum 13 and sprocket 15, when released from clutch bar 32 stops through the influence of the brake, so that chain 6 is carried around sprocket 15, now stationary, and the cages 7 are rotated one-half revolution during a complete revolution of the cages in their orbit. If lever 36 is immediately released bar 32 drops upon disk 16, engages jaw 17 and stops the rotation of cages 7 in proper alinement for extracting the opposite side of the honeycomb.

Though I have shown and described a particular construction, combination and arrangement of parts and portions I do not wish to be limited to this particular construction, combination and arrangement but desire to include in the scope of my invention the construction, combination and arrangement substantially as set forth in the appended claims.

From the foregoing description it is obvious that my invention provides an extractor which will receive several honey combs simultaneously in the several cages, will hold the comb cages and the honey combs placed therein positively tangential to the orbit in which they are whirled, provides means by which the comb cages and their honey combs may be easily, quickly and automatically rotated one-half turn or more so that the honey may be extracted alternately from the cells on opposite sides of the combs; that the slipping of the cages and turning from their proper, tangential position will be avoided, that all the cages may be operated simultaneously; that the honeycombs may be easily and quickly inserted into and removed from the cages, that the cages may be easily and quickly removed from the extractor for cleaning, that my extractor is simple of construction, easy to operate, strong, durable and will not readily get out of order.

Having thus described my invention what I claim as new and desire to secure by Letters Patent is:

1. A honey extractor, consisting of a case, honeycomb cages revolubly mounted in said case, means for whirling said cages in an orbit, means for rotatably mounting said cages on said means for whirling said cages, means for rotating said cages relative to their orbit of revolution, means for stopping the rotation of said cages and holding them tangential to their orbit comprising sprocket wheels operatively connected with said cages, a sprocket wheel operatively connected with said means for whirling, a brake operatively connected with said last named sprocket wheel, a clutch releasably connecting said means for whirling with said last-named sprocket wheel, and a sprocket chain operatively connecting said first-named sprocket wheels with said last-named sprocket wheel.

2. A honey extractor, consisting of a case, honeycomb cages revolubly mounted in said case, means for whirling said cages in an orbit, means for rotatably mounting said cages on said means for whirling said cages, means for rotating said cages relative to their orbit of revolution, means for stopping the rotation of said cages and holding them tangential to their orbit comprising sprocket wheels operatively connected with said cages, a sprocket wheel operatively connected with said means for whirling, a brake operatively connected with said last named sprocket wheel, a clutch releasably connecting said means for whirling with said last-named sprocket wheel and means for manually operating said clutch.

3. A honey extractor including, a case, a hollow shaft revolubly mounted in said case, a disk member secured on said shaft in said case, a plurality of perforate honeycomb receptacles, revolubly mounted on said disk, means for guiding the upper ends of said honeycomb receptacles, means for revolving said honeycomb receptacles a one-half revolution comprising, a sprocket wheel secured to each of said receptacles, a sprocket chain connecting said sprocket wheels, means revoluble with said disk for shifting said sprocket chain a certain pre-determined distance; comprising a sprocket wheel engaging said sprocket chain, a lever positioned on the upper side of said disk, with one end operatively connected to said sprocket wheel and means reciprocally mounted in said shaft, pivotally connected to the other arm of said lever.

In testimony whereof, I have hereunto set my hand at San Diego, California, this 8th day of December, 1921.

GEORGE L. MORRIS.